(12) United States Patent
Fujii et al.

(10) Patent No.: US 6,274,108 B1
(45) Date of Patent: *Aug. 14, 2001

(54) RECOVERY OF CARBON DIOXIDE FROM COMBUSTION EXHAUST GAS

(75) Inventors: Masumi Fujii, Nara-ken; Yoshitsugu Hotta, Kawachinagano; Taiichiro Suda, Nara; Kenji Kobayashi, Osaka; Kunihiko Yoshida, Nagaokakyo; Shigeru Shimojo, Osaka; Mutsunori Karasaki, Tokyo; Masaki Iijima, Tokyo; Toru Seto; Shigeaki Mitsuoka, both of Hiroshima, all of (JP)

(73) Assignees: The Kansai Electric Power Co., Ltd., Osaka; Mitsubishi Jukogyo Kabushiki Kaisha, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,154

(22) Filed: Feb. 28, 1997

Related U.S. Application Data

(63) Continuation of application No. 08/538,431, filed on Oct. 2, 1995, now abandoned, which is a continuation of application No. 08/151,429, filed on Nov. 15, 1993, now abandoned, which is a division of application No. 07/957,185, filed on Oct. 7, 1992, now Pat. No. 5,339,633.

(30) Foreign Application Priority Data

| Oct. 9, 1991 | (JP) | 3-262296 |
| Oct. 9, 1991 | (JP) | 3-262297 |
| Oct. 14, 1991 | (JP) | 3-264336 |

(51) Int. Cl.$^7$ .................................................. B01D 53/62

(52) U.S. Cl. .............................. 423/228; 423/229; 95/236

(58) Field of Search .............................. 95/236; 423/228, 423/229

(56) References Cited

U.S. PATENT DOCUMENTS

| 2,466,183 | * | 4/1949 | Reed | 423/229 |
| 3,489,506 | * | 1/1970 | Galstaun et al. | 423/228 |

(List continued on next page.)

FOREIGN PATENT DOCUMENTS

| 0 066 940 | 12/1982 | (EP) . |
| 0 133 208 | 2/1985 | (EP) . |

(List continued on next page.)

OTHER PUBLICATIONS

Dow Chemical Co., "Gas Conditioning Fact Book" (1962) pp. 145, 225–229.*

Kirk–Otmer, editors, "Encyclopedia of Chemical Technology", 3rd ed., vol. 4, pp. 730, 734–735 (1978).*

(List continued on next page.)

*Primary Examiner*—Steven P. Griffin
*Assistant Examiner*—Timothy C. Vanoy
(74) *Attorney, Agent, or Firm*—Jacobson Holman, PLLC

(57) ABSTRACT

A process is provided for removing carbon dioxide out of combustion exhaust gas by scrubbing the exhaust gas with an aqueous solution of monoethanolamine in a scrubber, and regenerating the carbon dioxide-loaded aqueous solution of monoethanolamine in a regenerator. The process is provided with means for replenishing the aqueous solution of monoethanolamine with a stock, aqueous solution containing from about 70% to about 75% by weight of monoethanolamine. By providing a stock, aqueous solution containing from about 70% to about 75% by weight of monoethanolamine, which is injected into the carbon dioxide-loaded aqueous solution of monoethanolamine being transferred from the scrubber to the regenerator, the entire carbon dioxide recovery system is free from flammables, rendering fire-fighting precautions unnecessary.

3 Claims, 5 Drawing Sheets

U.S. PATENT DOCUMENTS

| | | | | |
|---|---|---|---|---|
| 3,826,811 | * | 7/1974 | Hakka | 423/229 |
| 3,980,759 | | 9/1976 | Henderson et al. | 423/236 |
| 4,364,915 | * | 12/1982 | Proctor | 423/229 |
| 4,440,731 | * | 4/1984 | Pearce | 423/228 |
| 4,477,419 | * | 10/1984 | Pearce et al. | 423/228 |
| 4,869,884 | * | 9/1989 | Riggs, Jr. | 423/229 |

FOREIGN PATENT DOCUMENTS

| | | |
|---|---|---|
| 0 179 346 | 10/1987 | (EP) . |
| 0502596A1 | 9/1992 | (EP) . |
| 2 413 117 | 7/1979 | (FR) . |
| 745406 * | 2/1956 | (GB) ................................. 423/228 |
| WO88/00085 | 1/1988 | (WO) . |

OTHER PUBLICATIONS

Newman, Stephen A., Acid and Sour Gas Treating Processes, Houston: Gulf Publishing (1985), pp. 242–245 and 298–300.*

Database WIPL, Section Ch, Week 9140, Derwent Publications Ltd., (1991).

* cited by examiner

FIG. I

RECOVERY OF CARBON DIOXIDE FROM COMBUSTION EXHAUST GAS

This is a continuation of application Ser. No. 08/538,431, filed Oct. 2, 1995 which was abandoned upon the filing hereof;

which in turn is a continuation of application Ser. No. 08/151,429, filed Nov. 15, 1993 which was abandoned;

which in turn is a divisional of U.S. Ser. No. 07/957,185 filed on Oct. 7, 1992, now U.S. Pat. No. 5,339,633, issued Aug. 23, 1994.

BACKGROUND OF THE INVENTION

1. Field of the Invention

The present invention relates to a method of recovering carbon dioxide gas present in combustion exhaust gas. More specifically, it relates to carbon dioxide recovery in a power plant provided with equipment therefor and which performs steam power generation while carbon dioxide is recovered from the combustion exhaust gas from the boiler, and relates also to an efficient power generating method therefor. Also, it relates to a method for absorbing and recovering carbon dioxide contained in combustion exhaust gas, using an aqueous solution of monoethanolamine as an absorbing solution. Further, it relates to a method for recovering carbon dioxide from combustion exhaust gas which comprises cooling combustion exhaust gas to a given temperature range by wet cooling or other method, absorbing carbon dioxide contained in the gas using an aqueous solution of monoethanolamine as an absorbing solution, and then recovering the carbon dioxide from the aqueous monoethanolamine solution.

2. Description of the Related Art

In recent years the greenhouse effect of carbon dioxide has arrested attention as a factor responsible for the global warming phenomenon, and a measure against it is urgently sought in worldwide efforts to protect the environments on the earth. The source of carbon dioxide is omnipresent in every field of human activities that involve the combustion of fossil fuels, and the trend is heading toward stricter emission control of carbon dioxide. In view of these, energetic studies are under way on the recovery of carbon dioxide from combustion exhaust gases, especially from those emitted from power-generating installations such as steam power plants that burn large volumes of fossil fuels, and on the storage of the recovered carbon dioxide without discharging it to the atmosphere.

As a way of recovering carbon dioxide from combustion exhaust gas containing carbon dioxide, a system illustrated in FIG. 6 has already been proposed. FIG. 6 shows only major components and omits auxiliaries.

FIG. 6 shows a turbine-driven generator 2 into which steam produced by a boiler 1 is conducted via line 3 for power generation. The combustion exhaust gas emitted by the boiler 1 is led through line 4 to a cooler 5, where it is cooled by contact with cooling water, and the cooled gas is transferred through line 6 to an absorber 7. The absorber 7 is supplied, from its top, with an aqueous solution of monoethanolamine at a concentration of about 20 to 30 percent by weight via line 8. The aqueous monoethanolamine solution falls in countercurrent contact with the combustion exhaust gas, takes up carbon dioxide from the gas, and, as an aqueous monoethanolamine solution containing the absorbed carbon dioxide, flows out at the bottom of the absorber column 7 and is led through line 9 to an aqueous monoethanolamine regenerator 10. The combustion exhaust gas from which carbon dioxide has been removed by absorption is released from the top of the absorber 7 to the atmosphere through line 11.

Inside the aqueous monoethanolamine regenerator 10, heating with steam from a reboiler 13 regenerates the aqueous monoethanolamine solution that has absorbed carbon dioxide, and the regenerated solution is returned to the absorber 7 via line 8. Carbon dioxide is conducted through line 14 to a recovery step. Where necessary, a heat exchanger may be installed to effect heat exchange between the lines 8 and 9. For a heat supply to the reboiler 13, either steam produced by the boiler 1 or low pressure-side steam extracted from the turbine-driven generator 2 is conducted through line 12 to the reboiler.

In the above-described system, while thermal generation is in progress, carbon dioxide is recovered by absorption from the combustion exhaust gas, and the amount of steam consumed by the reboiler 13 accounts for as much as about 20 percent of the total steam production by the boiler 1. On the other hand, the demand for electricity varies widely within a day. The demand is high especially in the daytime, from about ten o'clock in the morning to about five in the afternoon. Thus, it is important to boost power supply sufficiently for this peak period. In reality, as noted above, about 20 percent of the steam supply for power generation must be set aside for the regeneration of the aqueous monoethanolamine solution, with a corresponding reduction of power generated. A solution to this problem has been sought.

Also, prior to the current public interest in the recovery of carbon dioxide gas present in combustion exhaust gases, in order to absorb and remove carbon dioxide from combustible gases, such as natural gas, ammonia gas, and hydrogen gas, monoethanolamine had been used and it is still in use for such purposes. Monoethanolamine is usually used as a low-concentration aqueous solution containing 40 percent or less by weight and is not flammable itself. Flammable is the stock solution used to replenish the monoethanolamine consumed during the recovery of carbon dioxide or to adjust the concentration of the absorbing solution. The stock solution is customarily stored in the form of either a high-concentration aqueous solution or undiluted, 100% monoethanolamine in a tank or the like within the recovery equipment. To minimize the storage tank volume, storage is preferably done in its undiluted form. However, the 100% monoethanolamine has a solidifying temperature of 10.5° C., and in order to avoid the solidification in cold weather it is sometimes replaced by a flammable aqueous solution at as high a concentration as about 85 percent by weight (nonfreezing grade). Inasmuch as the equipment for recovering carbon dioxide from such a combustible gas as referred to above is designed primarily to handle the combustible gas, all the motors, measuring instruments, electric facilities, etc. are made explosion-proof. Fire-fighting arrangements, of course, are also provided. Thus, it has been unnecessary to consider extra protection against explosion hazards in storing the flammable stock solution of monoethanolamine at such a high concentration.

However, as we described above, as the absorption of carbon dioxide gas from combustion exhaust gas is now gathering more attention, the following problems have been noted. That is, with an equipment for absorbing carbon dioxide out of combustion exhaust gas, the situation is utterly different from that for a conventional apparatus for recovering carbon dioxide from combustible gases. The gas which has to be dealt with is nonflammable by nature.

Practically the only flammable matter that requires explosion-proof arrangements and extinguishing facilities is the stock solution of monoethanolamine for use in replenishing the monoethanolamine consumed for the recovery of carbon dioxide or for use in adjusting the concentration of the solution. However, because the flammable stock solution is stored and used within, the carbon dioxide recovery equipment must have many components guarded against explosion, with the installation of fire extinguishers, as is the case with the above-mentioned equipment for carbon dioxide recovery from combustible gas. Needless to say, the use of explosion-proof motors, measuring instruments, and electric facilities, plus extinguishers, is much costlier than the adoption of a system without explosion-proofing.

Furthermore, when carbon dioxide gas is absorbed from combustion exhaust gas using a monoethanolamine solution, the following problems have been noted with respect to the temperature of the exhaust gas.

FIG. 5 shows the saturation curve under the partial pressure of carbon dioxide accounting for 8 percent by volume of the atmosphere, when an aqueous solution of monoethanolamine at a concentration of about 30 percent by weight is used for absorbing carbon dioxide contained in combustion exhaust gas. The abscissa of FIG. 5 is the temperature (°C.) and the ordinate is the number of moles of carbon dioxide absorbed per unit mole of monoethanolamine. As is clear from FIG. 5, the lower the temperature of carbon dioxide that comes in contact with the solution, the larger the amount of carbon dioxide absorbed by the aqueous monoethanolamine solution becomes. Another reason for which the lower gas temperature is preferred when the gas contacts with the aqueous monoethanolamine solution is that the absorption of carbon dioxide by the monoethanolamine solution entails heat generation. It has therefore been believed necessary to cool the gas downright, e.g., to the range of about 30° C. to 50° C. Thus the conventional equipment for the recovery of carbon dioxide from combustion exhaust gas uses an expensive gas cooling installations.

The operation of the recovery equipment too is quite costly because a heat exchanger or the like must be used to cool the cooling water for such gas cooling installations. In particular, combustion exhaust gas from a boiler or other furnace that burns natural gas poses problems that do not arise from exhaust gases from the combustion of coal or heavy oil. For example, the gas temperature will not come down readily upon mere wetting which is done by bringing the gas into contact with cooling water; the gas must cooled by contact with water which is particularly cooled using a heat exchanger.

SUMMARY OF THE INVENTION

In view of the above-described problem associated with the power generation with concurrent recovery of carbon dioxide by absorption from the combustion exhaust gas of the boiler in such a system as shown in FIG. 6, the present inventors have intensively searched for a solution. It has now been found, as a result, that the problem can be overcome by providing facilities for storing both the carbon dioxide absorbing solution, e.g., aqueous monoethanolamine solution, that has absorbed carbon dioxide and for the regenerated aqueous monoethanolamine solution, and by operating a regenerator to regenerate the stored carbon dioxide-containing monoethanolamine solution during a time period when demand for power is small. This has led the inventors to a first and second aspect of the present invention.

That is, an object of the first and second aspects of the present invention is to utilize variations in the demand of power more effectively.

The first aspect of the present invention resides in the recovery of carbon dioxide from a power plant with a carbon dioxide recovery equipment attached thereto including a boiler as a steam source, a steam turbine-driven generator, an absorber wherein carbon dioxide in the combustion exhaust gas from the boiler is absorbed by a carbon dioxide absorbing solution, and a regenerator for the carbon dioxide absorbing solution that utilizes the steam extracted from the boiler or turbine-driven generator as a heat source; said power plant comprising a storage unit for the carbon dioxide absorbing solution having absorbed carbon dioxide and a storage unit for the regenerated carbon dioxide absorbing solution.

The second aspect of the present invention resides in a method for generating electricity in which power is generated by a turbine-driven generator using a boiler as a steam source, carbon dioxide is simultaneously absorbed from combustion exhaust gas emitted from the boiler by means of an absorbing solution, and the absorbing solution is generated by a regenerator which depends for heat supply on steam extracted from the boiler or turbine-driven generator; which method being characterized in that the regenerator is kept inoperative when demand for power is high and the carbon dioxide absorbing solution having absorbed carbon dioxide is stored in a storage unit therefor; and when the demand is low the stored carbon dioxide absorbing solution is regenerated by operating the regenerator and regenerated carbon dioxide absorbing solution is stored in a storage unit therefor.

Also, an object of a third aspect of the present invention is to reduce flammability of a monoethanolamine solution used in the absorption of carbon dioxide.

In view of the situation encountered with the equipment for absorbing carbon dioxide from combustion exhaust gas, the present inventors have made exhaustive investigations on the monoethanolamine to be employed as a stock solution for the absorbing solution. They have now found, as a result, that the above-mentioned aqueous solution with a concentration of about 85 percent by weight can be made nonflammable by dilution with a small amount of water and that the employment of this nonflammable aqueous monoethanolamine solution simply solves the above problem. This has led the inventors to the third aspect of the present invention.

The third aspect of the present invention thus relates to a method for recovering carbon dioxide from combustion exhaust gas which contains carbon dioxide, using an aqueous solution of monoethanolamine as an absorbing solution, characterized by the use of a nonflammable aqueous monoethanolamine solution as a stock solution for replenishment or for adjusting the concentration of the absorbing solution.

In view of the above-described state of art with respect to the temperature of combustion exhaust gas for absorption and recovery of carbon dioxide contained in the gas, the present inventors have intensively studied on the relation between the gas temperature and the amount of carbon dioxide absorbed by the aqueous monoethanolamine solution. Surprisingly, it has now been found that the absorption is augmented by a higher gas temperature rather than the accepted range of 30° C. to 50° C. This finding led the inventors to the fourth to sixth aspects of the present invention.

An object of the fourth to sixth aspects of the present invention relates to the optimization of the temperature of exhaust gas to be treated.

The fourth aspect of the present invention resides in a method for recovering carbon dioxide by absorption from combustion exhaust gas containing carbon dioxide, using an aqueous solution of monoethanolamine as an absorbing solution, characterized in that the gas temperature is adjusted to a range between 50° C. and 80° C., and then the gas is brought into contact with the aqueous monoethanolamine solution.

The fifth aspect of the invention is characterized in that the cooling is done by wet cooling in the method according to the fourth aspect of the present invention.

The sixth aspect of the invention provides a method for recovering carbon dioxide from combustion exhaust gas comprising the steps of cooling a high-temperature combustion exhaust gas by wet cooling, using a cooling water supply means without any heat exchanger, absorbing carbon dioxide from the wet-cooled gas by means of an aqueous monoethanolamine solution, and recovering carbon dioxide from the aqueous monoethanolamine solution.

BRIEF DESCRIPTION OF THE DRAWINGS

The invention will now be described in detail with reference to the accompanying drawings wherein.

DETAILED DESCRIPTION OF THE PREFERRED EMBODIMENTS

Figure 1:
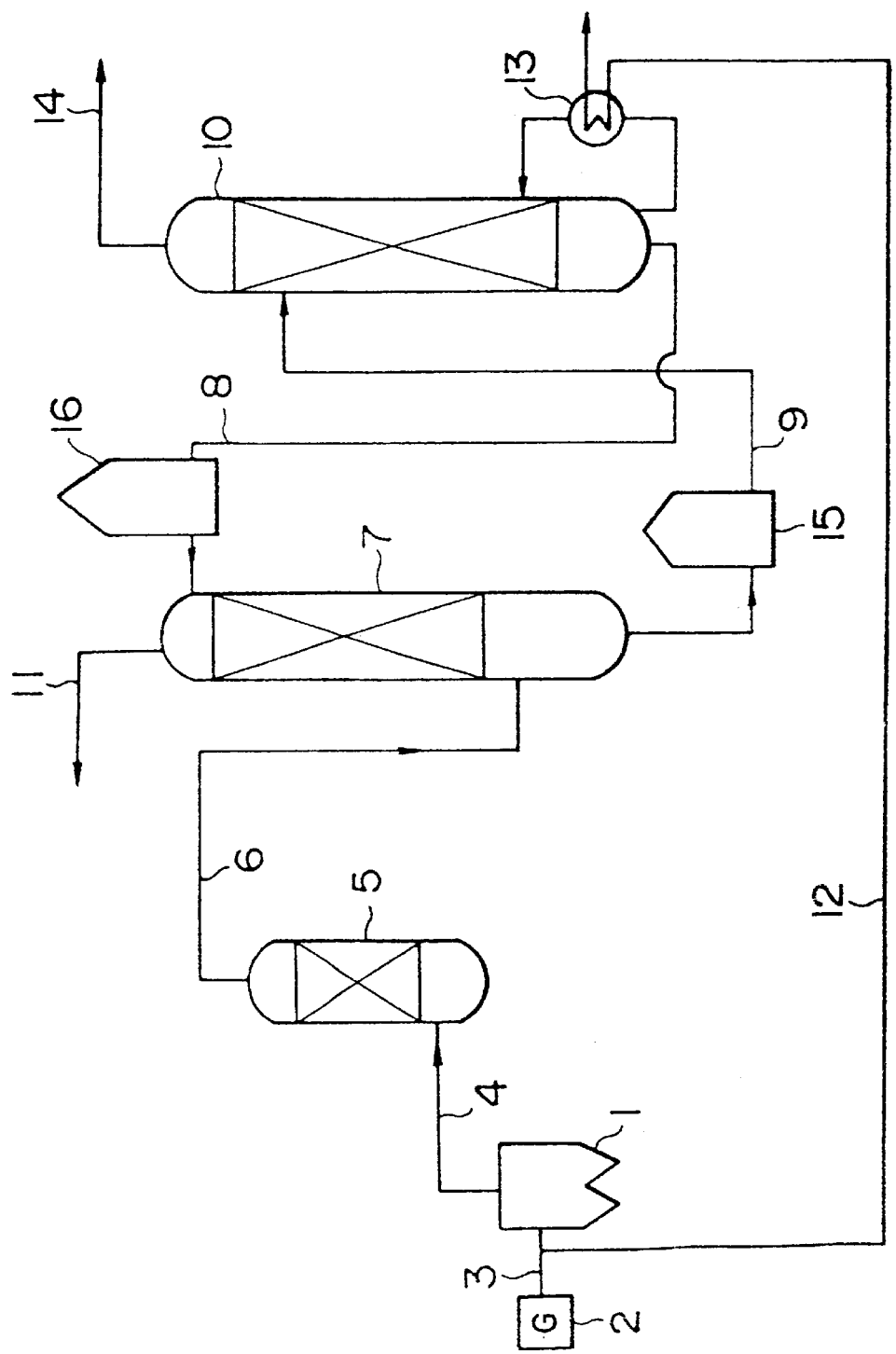
FIG. 1 is a schematic diagram of an exemplary power plant with carbon dioxide recovery equipment attached thereto.
Figure 6:
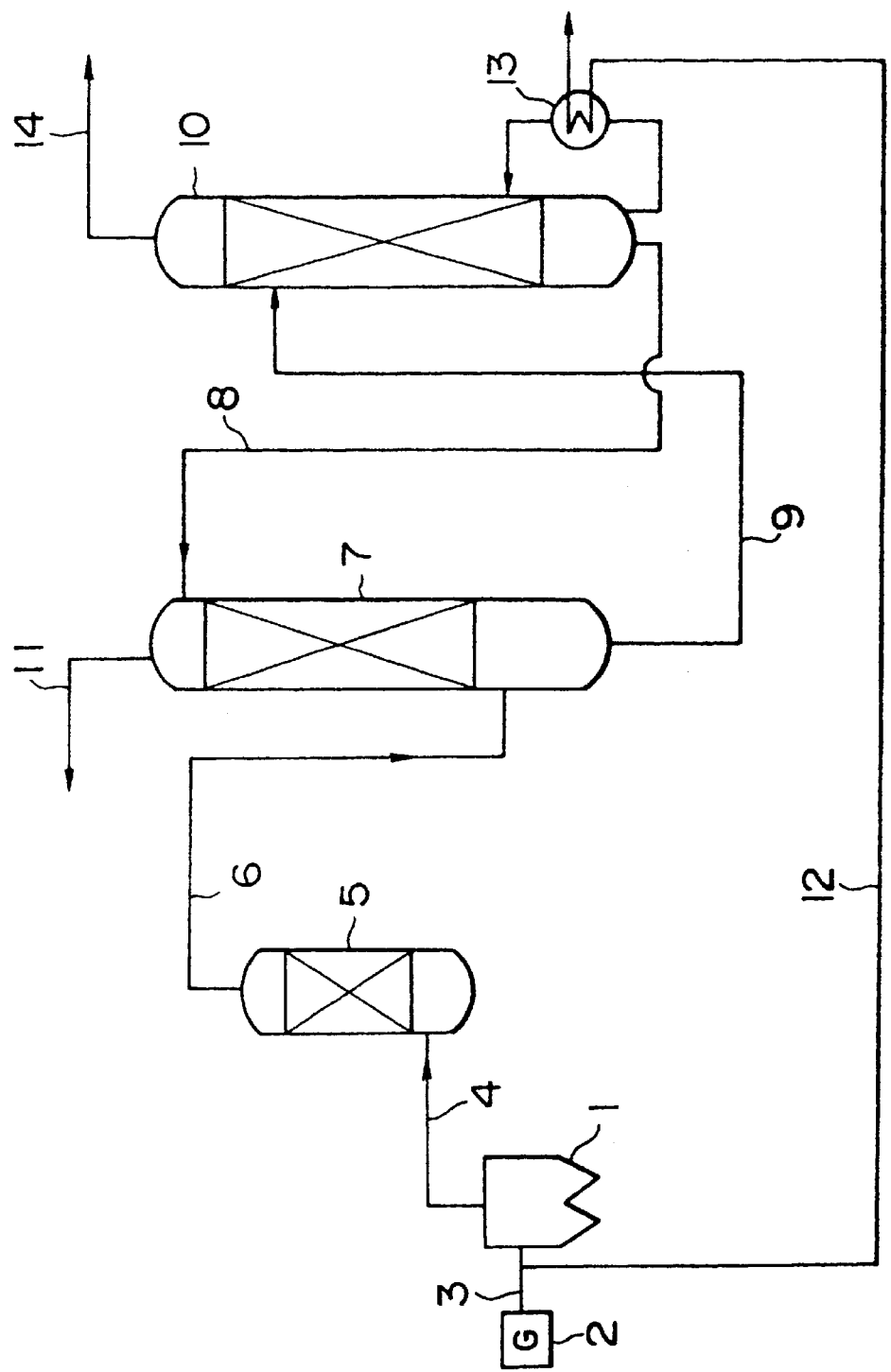
FIG. 6 is a schematic diagram of an example of conventional power plant with a carbon dioxide recovery equipment.

A power plant with carbon dioxide recovery equipment attached thereto according to the first aspect of the invention is exemplified in FIG. 1. Only major components are shown and auxiliaries omitted. Where necessary, valves, pumps, heat exchangers, etc. are installed. The parts similar to those shown in FIG. 6 are designated by like numerals.

FIG. 1 shows a tank 15 as a storage unit for the carbon dioxide absorbing solution having absorbed carbon dioxide and a tank 16 as a storage unit for the regenerated carbon dioxide absorbing solution. These units enable the absorber 7 to operate for carbon dioxide absorption day and night as long as the generation of electricity is in progress. However, the absorbing solution that has absorbed carbon dioxide is not regenerated during the period, e.g., daytime, when the power supply tends to become short compared with increased demand. Thus, in daytime, steam is not extracted from line 12 and the production of electric power can be increased accordingly. Throughout this period the carbon dioxide-containing absorbing solution from the absorber 7 is stored in the tank 15 and, during the low demand period, e.g., at night, the regenerator 10 is operated for regeneration. The intermittent operation of the regenerator 10 necessitates the installation of the tank 16 for storing the regenerated carbon dioxide absorbing solution.

The capacities of these tanks vary partly with actual differences in power demand between day and night. Generally, the tanks desirably have capacities to hold at least one-third to one-half of the daily processing capacities of the absorber 7 and the regenerator 10, respectively.

Examples of the carbon dioxide absorbing solution include: aqueous alkaline solutions, such as those of hindered amine compounds and potassium carbonate; aqueous alkanolamine solutions, such as of monoethanolamine, diethanolamine, triethanolamine, methyldiethanolamine, diisopropanolamine, and diglycolamine; and mixtures of these aqueous solutions. An aqueous monoethanolamine solution is preferably used.

The present invention necessitates the addition of the tanks 15 and 16 to the conventional plant illustrated in FIG. 6. However, it is worthy of special mention that the economical merit of increased power generation during the daytime when the demand is heavy distinctly outweighs the drawback of extra investment on the tanks. Currently the construction of a power plant, say a 600-MW power plant, is known to cost about one hundred thousand yen per kilowatt of the generating capacity. Also, approximately 30 percent of the low pressure steam produced is consumed for the regeneration of carbon dioxide-containing absorbing solution. In view of these, our estimate is that if the incorporation of the present invention permits the plant to generate about 10 percent more electricity, it will be possible to recover about six billion yen of the investment on the installation. Addition of two tanks, e.g., each capable of holding about 40,000 m$^3$ of a carbon dioxide absorbing solution, such as an aqueous monoethanolamine solution, will involve an expenditure of about one billion yen. It is clear that the present invention will make a substantial cost reduction possible.

As has been described in detail, the first and second aspects of the present invention make it possible for a power plant which generates electricity and which uses a carbon dioxide absorber for removing carbon dioxide from the combustion exhaust gas to operate efficiently and respond to increased power demands during the daytime.

Figure 2:
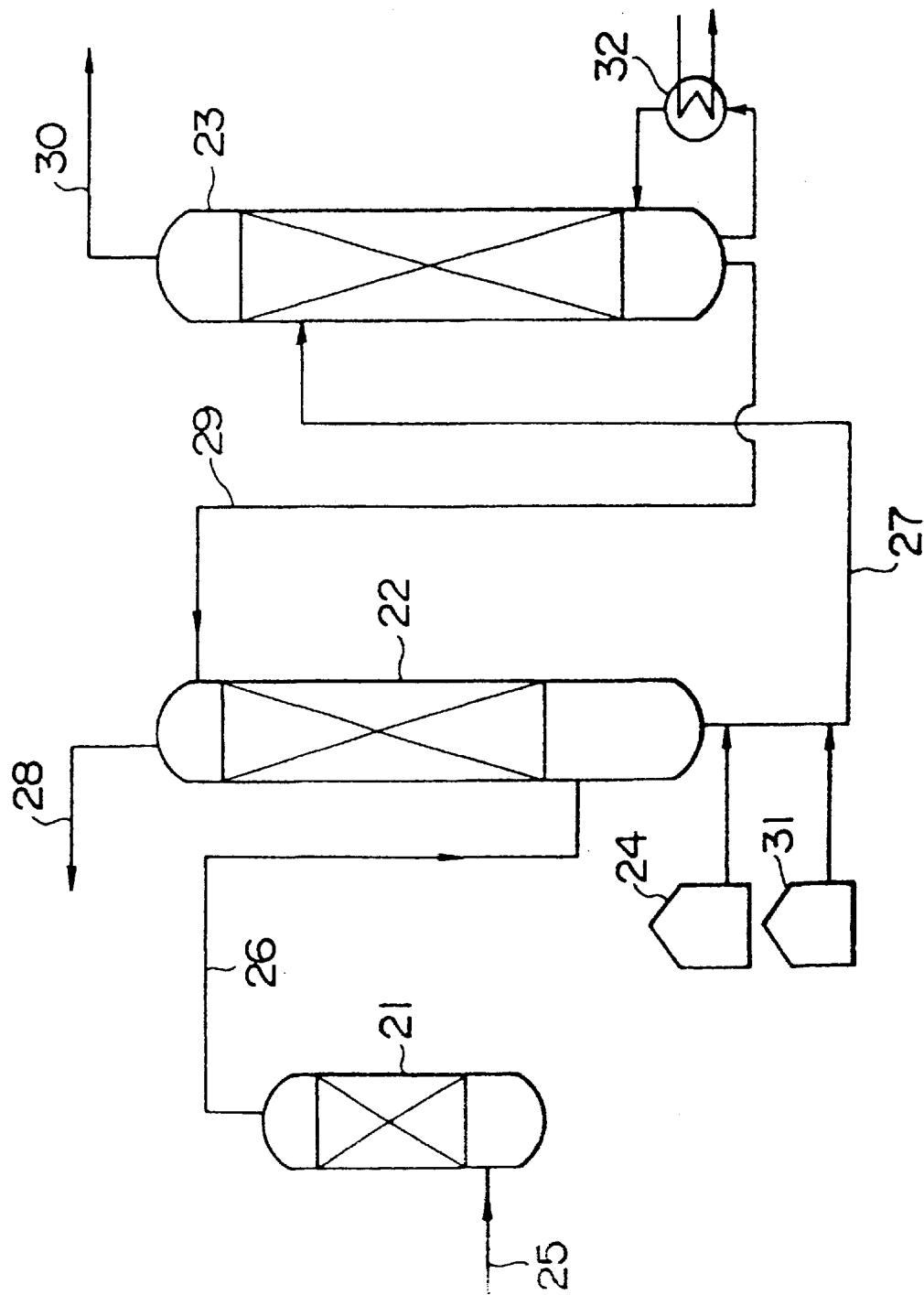
FIG. 2 is a schematic diagram of an exemplary recovery equipment for use in the method of the third aspect of the invention for recovering carbon dioxide.

FIG. 2 shows as an example an equipment to be used for the method of the third aspect of the invention in absorbing carbon dioxide from combustion exhaust gas containing the carbon dioxide. Only major devices are shown, with the pumps and other auxiliary components being omitted in FIG. 2.

Combustion exhaust gas is introduced via line 25 into a combustion exhaust gas cooler 21, where it is cooled and transferred through line 26 into an absorber 22. The absorber 22 is supplied, at its top, with an aqueous solution of monoethanolamine at a concentration of about 20 to 30 percent by weight via line 29. The aqueous monoethanolamine solution falls in countercurrent contact with the combustion exhaust gas, takes up carbon dioxide from the gas, and, as an aqueous monoethanolamine solution containing the absorbed carbon dioxide, flows out at the bottom of the absorber column and is led through line 27 to an aqueous monoethanolamine regenerator 23. The combustion exhaust gas from which carbon dioxide has been removed by absorption is released from the top of the absorber 22 to the atmosphere through line 28. Steam from a reboiler 32 passes through the aqueous monoethanolamine regenerator 23, and regenerates the aqueous monoethanolamine solution. The regenerated solution is returned to the absorber 22 via line 29. Carbon dioxide is conducted through line 30 to a recovery process.

While this carbon dioxide absorption-recovery system is in operation, monoethanolamine is gradually lost as partly entrained by the gas being discharged or as deterioration products. To make up for the loss, for example, a stock solution of monoethanolamine is supplied from a tank 24 and likewise diluting water is supplied from a tank 31 to line 27. The stock solution of monoethanolamine is usually delivered to the equipment by a tank truck or the like.

The third aspect of the present invention is characterized by the use of a nonflammable aqueous monoethanolamine solution as a stock solution in place of the conventional monoethanolamine solution that has been substantially the only flammable material in carbon dioxide recovery equipment. Inasmuch as the monoethanolamine stock solution received by the tank 24 for subsequent use is nonflammable, the entire carbon dioxide recovery system is free from flammables. This makes it practically unnecessary to take precautionary measures for handling flammable matter. Hence all the motors, measuring instruments, electric facilities, etc. to be employed need not be explosion-proof, and fire-fighting arrangements are no longer essential. Although the present invention necessitates a slightly larger tank than usual for the monoethanolamine stock solution, this shortcoming is trivial compared with the great safety and economical merit of constructing the entire equipment without explosion proofing.

The monoethanolamine stock solution to be used in the present invention is a nonflammable aqueous solution. Table 1 shows the relationship between the monoethanolamine concentration in the aqueous solution and the physical properties such as the flash point and fire point.

TABLE 1

| Concentration (wt %) | Flash point (° C.) | Fire point (° C.) | Boiling point (° C.) | Remarks |
|---|---|---|---|---|
| 100 | 97 | * | 171 | |
| 90 | 104 | 111 | * | |
| 80 | 129 | 132 | * | |
| 75 | ** | ** | * | Boils but catches no fire. |
| 70 | ** | ** | * | Boils but catches no fire. |

\* = not tested.
\*\* = caught no fire, and hence no measurable value.

The flash point was determined by the Cleveland method. The table indicates that the maximum concentration of monoethanolamine up to which the aqueous solution remains non-flammable is somewhere between 75 percent and 80 percent by weight. It will be appreciated that the maximum concentration can be easily attained by diluting with a small amount of water the aqueous monoethanolamine solution at a concentration of about 85 percent by weight (nonfreezing grade), or the solution of lowered solidifying point often used in conventional equipment for carbon dioxide recovery from combustible gases. The stock solution to be used in this invention is satisfactory if it is nonflammable and has a sufficiently high concentration for use as an absorbing solution. In order to minimize the volume of the storage tank for the stock solution and provide an allowance for safety at the same time, it is desirable to use an aqueous monoethanolamine solution at a concentration of 70 to 75 percent by weight.

As described above, using a nonflammable aqueous monoethanolamine solution prepared in accordance with the third aspect of the invention as a stock solution for the solution to absorb carbon dioxide from combustion exhaust gases brings a marked improvement in safety of the carbon dioxide recovery equipment against fire hazards. All the motors, measuring instruments, electric facilities, etc. can be without explosion proofing. In addition, fire-fighting arrangements are no longer essential.

Figure 3:
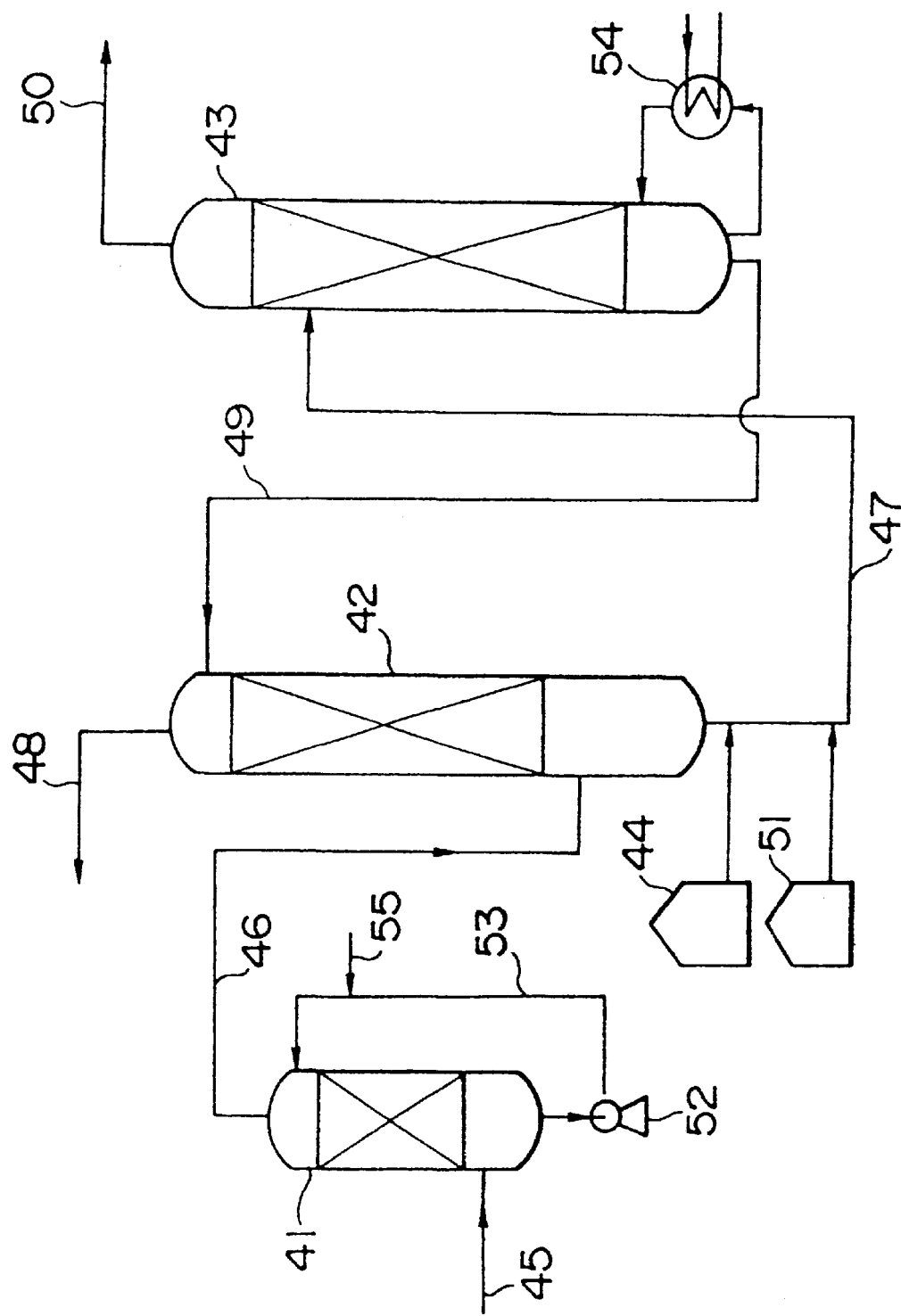
FIG. 3 is a schematic diagram of an exemplary recovery equipment for use in the method of the fourth to sixth aspects of the invention for recovering carbon dioxide.

FIG. 3 shows, as an example, an equipment to be used for the method of the fourth to sixth aspects of the invention in recovering carbon dioxide by absorption from combustion exhaust gas containing carbon dioxide. Only major devices are shown and auxiliary components are omitted in FIG. 3.

For the method of carbon dioxide recovery in accordance with the fourth to sixth aspects of the present invention, it is important to bring combustion exhaust gas into contact with an aqueous solution of monoethanolamine after the gas temperature has been adjusted to a range from over 50° C. to 80° C., preferably from 55° C. to 80° C. The temperature adjustment to the range from over 50° C. to 80° C. is desirably done by wet cooling, using an apparatus such as a cooler 41 shown in FIG. 3, but it is not a limitation to the invention. Combustion exhaust gas from a boiler or the like is discharged through a flue and introduced, usually at 100° C. to 150° C., into a combustion exhaust gas cooler 41 via line 45. The gas in the cooler is humidified and cooled by countercurrent contact with water which is circulated through line 53 by a pump 52.

According to the fourth to sixth aspects of the invention it is not necessary to cool the gas by the cooler 41 down to the range from 30° C. to 50° C. as is required in conventional processes. The gas need not be cooled below the range from over 50° C. to 80° C. The heat exchanger that has been conventionally required is not essential in the line 53; the line has only to circulate water in the liquid form according the present invention. Water is not limited to fresh water from river but may also be seawater. The loss of water due to wet cooling is replenished via line 55 to the line 53 from a source not shown. The cooler 41 is required merely to bring water and gas into contact, and the existence of packing material or the like in the column is not a requisite. The gas temperature at the exit of the cooler 41 can be adjusted with the amount of water being circulated by the pump 52.

The gas wet-cooled to a temperature in the range from over 50° C. to 80° C. is transferred through line 46 into an absorber 42. The absorber 42 is supplied, at its top, with an aqueous solution of monoethanolamine at a concentration of about 20 to 30 percent by weight via line 49. The aqueous monoethanolamine solution falls in countercurrent contact with the combustion exhaust gas, takes up carbon dioxide from the gas, and, as an aqueous monoethanolamine solution containing the absorbed carbon dioxide, flows out at the bottom of the column and is led through line 47 to an aqueous monoethanolamine regenerator 43. The combustion exhaust gas from which carbon dioxide has been removed by absorption is released from the top of the absorber 42 to the atmosphere through line 48.

Inside the aqueous monoethanolamine regenerator 43, heating with steam from a reboiler 54 regenerates the aqueous monoethanolamine solution, and the regenerated solution is returned to the absorber 42 via line 49. Carbon dioxide is conducted through line 50 to a recovery station.

While this carbon dioxide absorption-recovery system is in operation, monoethanolamine is gradually lost from the system, partly entrained by the gas discharged or partly as by-products due to degradation. To make up for the loss, for example, a stock solution of monoethanolamine is supplied from a tank 44, and likewise diluting water is supplied from a tank 51, both to the line 47.

Figure 5:
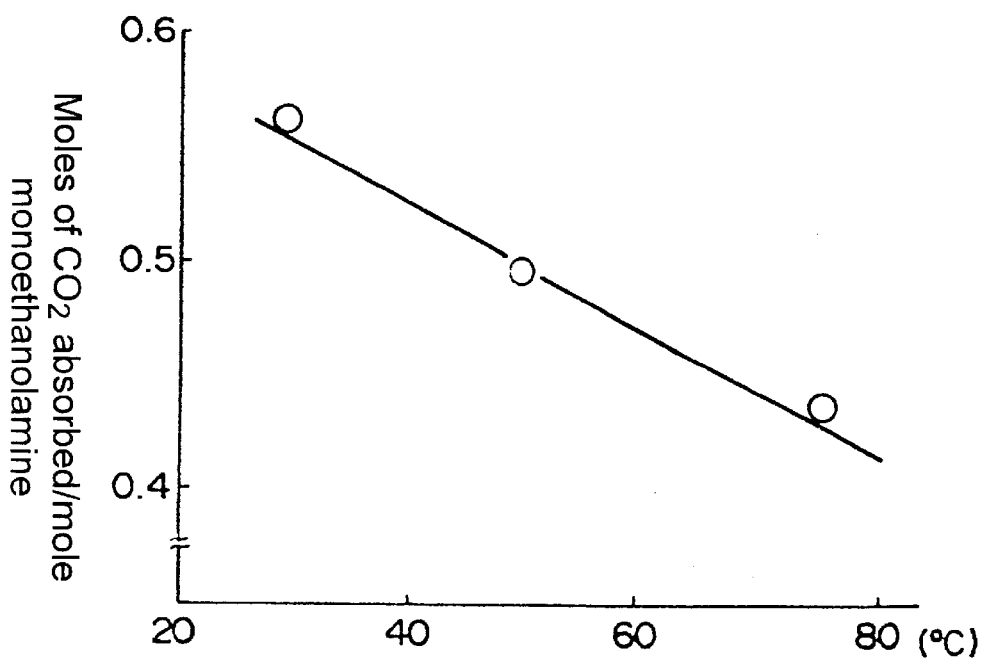
FIG. 5 is a graph showing a curve of saturation with carbon dioxide of an aqueous monoethanolamine solution.

As described above, the cooler 41 simply brings hot gas and water into contact, whereby the gas is wet-cooled to the range from over 50° C. to 80° C. Although the curve of saturation with carbon dioxide of the aqueous monoethanolamine solution has the tendency shown in FIG. 5, the aqueous monoethanolamine solution in contact with the gas at such a relatively high temperature exhibits a greater carbon dioxide absorption capacity than when in contact with a low-temperature gas. This is presumably attributable to a large measure to the carbon dioxide absorption rate of the aqueous monoethanolamine solution.

The gas thus simply cooled by humidification and still at a relatively high temperature may be brought into contact with the aqueous monoethanolamine solution. Consequently, the line 53 requires no heat exchanger for cooling the circulating water. This results in a significant reduction of equipment and operation costs.

The method of the invention is applicable to the gases resulting from the combustion of fuels, e.g., natural gas, heavy oil, and coal.

The fourth to six aspects of the invention are explained by the following experimental example.

Figure 4:
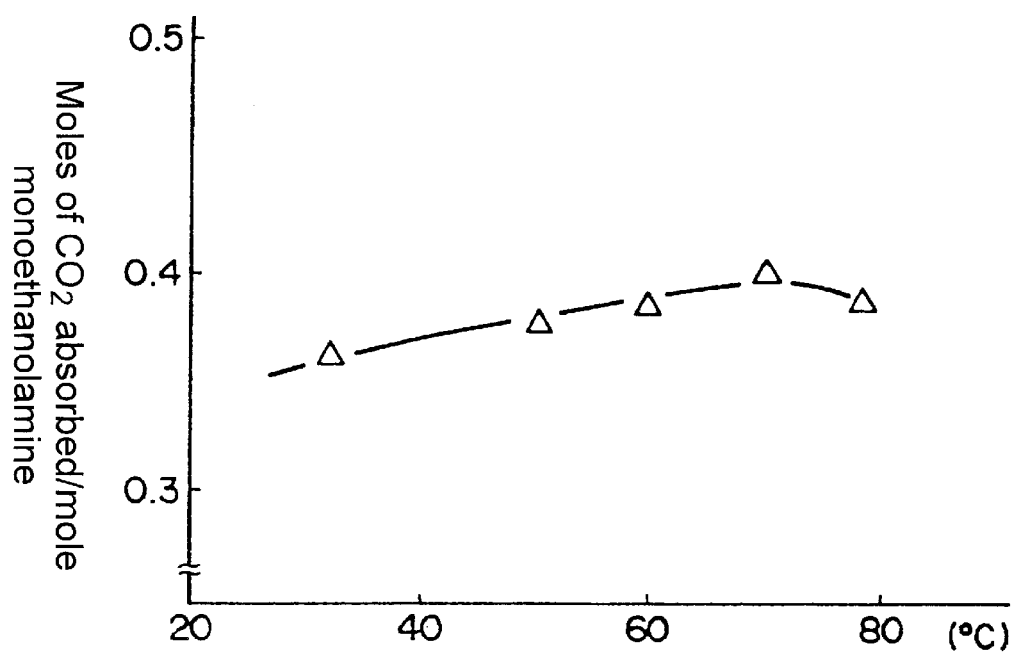
FIG. 4 is a graph showing the relation between the gas contact temperature (as abscissa) and the amount of absorption by an aqueous monoethanolamine solution (as ordinate, in number of moles of carbon dioxide absorbed per mole of the monoethanolamine in the solution) attained using the equipment of FIG. 3 in the working example of the invention.

FIG. 4 shows the results of investigations made on the relation between the temperature of combustion exhaust gas cooled by wet cooling using the apparatus shown in FIG. 3 and the amount of carbon dioxide absorbed by an aqueous monoethanolamine solution. The abscissa and ordinate units in FIG. 4 are the same as those used in FIG. 5.

The wet-cooled temperature of the gas was adjusted with the amount of circulating water.

Experimental conditions used were as follows:

(1) Gas composition in % by volume
  Carbon dioxide:8.55
  Oxygen:2.41
  Nitrogen:71.77
  Water vapor:17.27

(2) Gas temperature in the line 45 100° C.

(3) Monoethanolamine concentration in aqueous solution in the line 49: 30% by weight As is obvious from FIG. 4, the amount of carbon dioxide absorbed increases with temperature until it approximately reaches the peak around 70° C. This suggests that it is not necessary to cool the combustion exhaust gas to be treated down to 30° C. to 50° C., the accepted range in conventional processes.

As has been described in detail, the fourth to sixth aspects of the present invention renders it possible to have carbon dioxide absorbed efficiently from combustion exhaust gas by an aqueous monoethanolamine solution, by cooling the gas to a range from over 50° C. to 80° C. and then bringing it into contact with the monoethanolamine solution. Mere wet cooling with water suffices for the cooling of hot gas, and there is no need of using a heat exchanger or the like that has been considered essential in conventional methods and apparatuses for enhanced cooling of cooling water.

What is claimed is:

1. In a method for recovering carbon dioxide from combustion exhaust gas by passing the exhaust gas from a cooler to an absorbing column; passing a scrubbing solution of aqueous monoethanolamine through the absorbing column where the scrubbing solution counter-currently contacts the exhaust gas and absorbs the carbon dioxide out of the exhaust gas; discharging the cleaned exhaust gas from absorber; transferring the carbon dioxide-loaded scrubbing solution from the absorbing tower to a regenerator where the carbon dioxide is stripped out of the scrubbing solution, replenishing the scrubbing solution by injecting a supplemental, aqueous solution of monoethanolamine into the carbon dioxide-loaded scrubbing solution at a location between the absorbing column and the regenerator, and returning the regenerated scrubbing solution back to the absorbing column, the improvement comprises:

using an aqueous solution containing from about 70% to about 75% by weight of monoethanolamine as said supplemental, aqueous solution of monoethanolamine, and injecting water into the carbon dioxide-loaded scrubbing solution at a location between the location where the supplemental, aqueous solution of monoethanolamine is injected and the regenerator.

2. The method of claim 1, wherein the improvement further comprises adjusting the temperature of the exhaust gas in the cooler to a temperature between greater than 50° C. to 80° C.

3. The method of claim 2, wherein the exhaust gas is cooled in the cooler by counter-currently contacting the exhaust gas with water within the cooler.

* * * * *